May 30, 1933.    R. E. WAGNER    1,911,412
WATER SOFTENING APPARATUS
Filed June 13, 1930    2 Sheets-Sheet 1

INVENTOR
Richard E. Wagner
BY
Walter H. Pumphrey
ATTORNEY

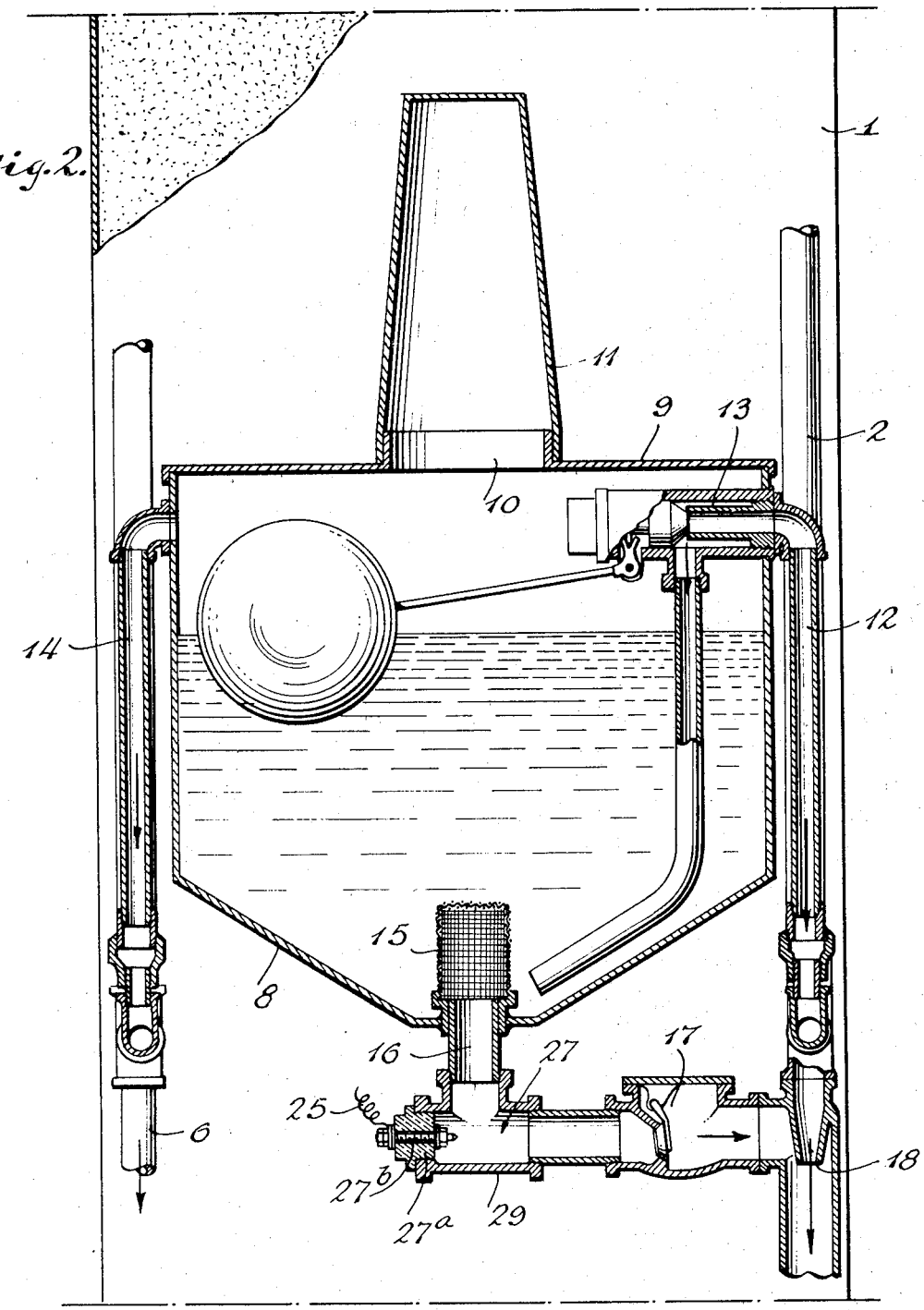

Patented May 30, 1933

1,911,412

UNITED STATES PATENT OFFICE

RICHARD E. WAGNER, OF ROCKAWAY PARK, NEW YORK

WATER SOFTENING APPARATUS

Application filed June 13, 1930. Serial No. 460,927.

My invention relates to water softening apparatus and while not limited in its application, is specially adapted, as herein embodied, for use in connection with the "upflow" type of such apparatus.

As many of the structural features of the apparatus disclosed herein have been made the subject of a separate application (Serial Number 460,926 Filed June 13, 1930), the present invention will be limited to means for automatically reconditioning or regenerating the zeolite employed in the water softening process.

It is well known that the zeolite method commonly employed in softening water involves an exchange process, by which the calcium and magnesium of the water are taken up by zeolite and the sodium of the zeolite is given off to the water.

As the accumulation of calcium and magnesium taken up by the zeolite acts to impair its effectiveness, it is necessary, from time to time, to recondition or regenerate the zeolite, and this is accomplished by reversing the above process, which consists in subjecting the zeolite to the action of common salt solution and results in again producing a sodium zeolite, effective for continued use.

A very serious objection to present day apparatus, is found in the method and means provided for introducing the salt or salt solution necessary for regenerating the zeolite and subsequently ejecting the solution, to clear the zeolite tank and permit the water softening process to be continued.

Ordinarily the apparatus is more or less complicated, and, in addition to requiring considerable manipulation of valves, etc., it is necessary to make a number of soap tests before the softening process can be safely resumed.

In order to overcome these objectionable features, it is the purpose, and object of the present invention to make the salting operation practically automatic, so that it will only be necessary for the attendant to pour a measured quantity of common salt into an open tank, in which water is maintained at a predetermined level and the regeneration of the zeolite and clearing of the zeolite tank will follow automatically, without requiring any further attention, manipulation, tests or other labor on the part of the operator or attendant.

The accompanying drawings will serve to illustrate apparatus suitable for carrying my invention into effect, but I do not wish to be understood as intending to limit myself to either the exact form or details shown, as various changes may be made therein, without departing from the spirit and scope of the invention, as set forth in the appended claims.

In the drawings:

Fig. 2 is a vertical sectional view of the auxiliary or salting tank and the outlet connections therefrom;

Figure 1:
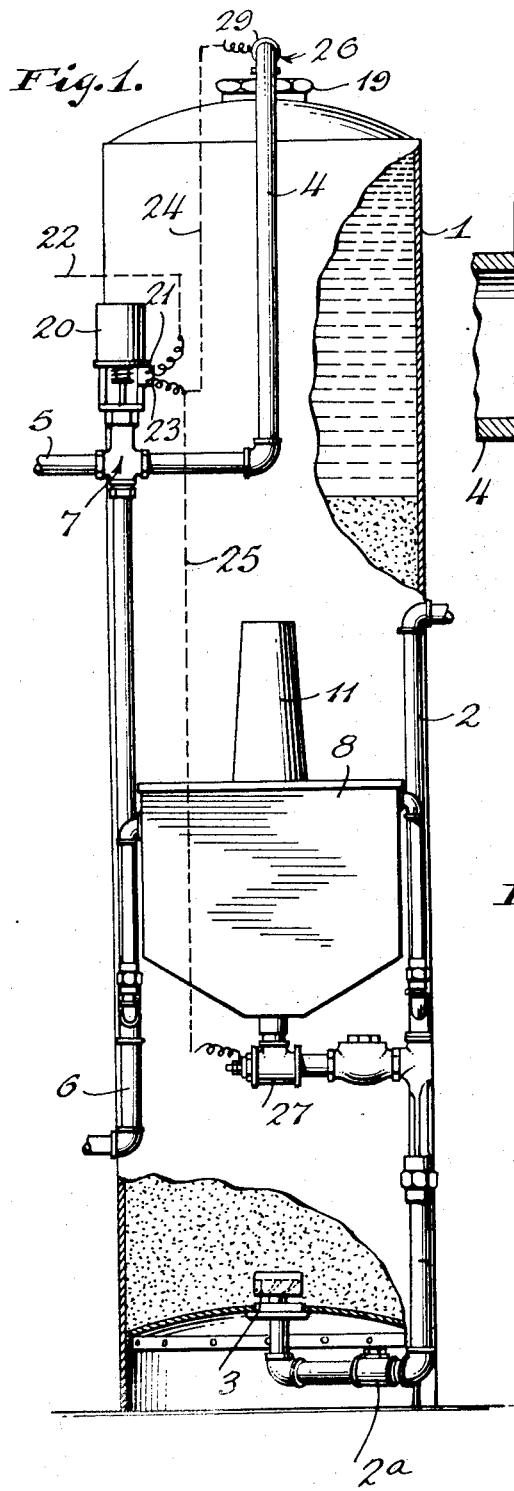
Fig. 1 is a view in elevation, with parts broken away, of a water softening apparatus, showing my invention applied.
Figure 4:
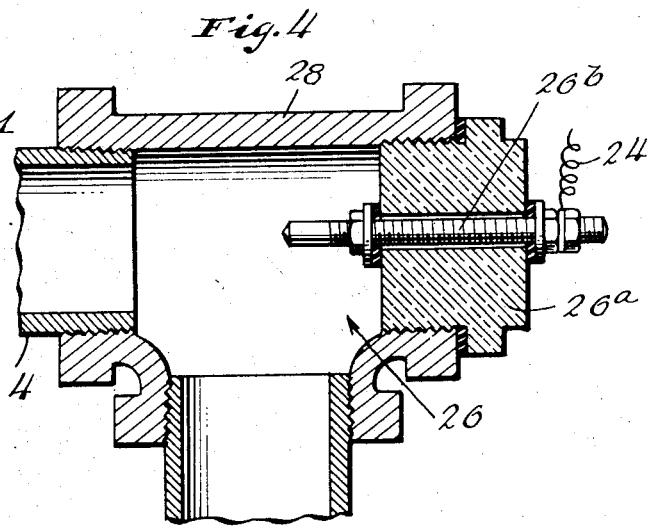
Fig. 4 is a detail sectional view of one of the open switches employed in the three-way valve operating circuit.
Figure 3:
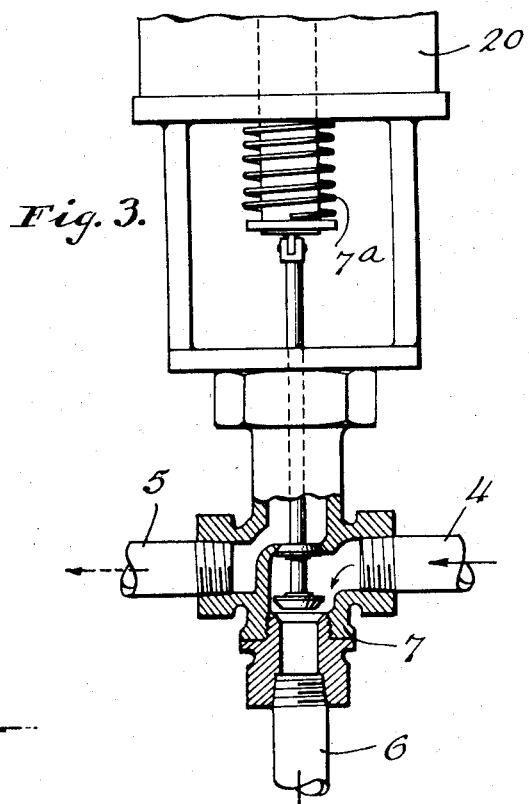
Fig. 3 is a detail sectional view of the electrically-operated three-way valve, controlling the outlet from the main tank.

Referring now to the drawings, 1 represents a zeolite tank or container, here shown of the vertical type and having dimensions suitable for providing any capacity required.

A hard water supply pipe 2, leads through a check valve 2ª to the bottom of the tank and terminates in any suitable form of distributing system. For convenience of illustration, there is shown here a head or nozzle 3, suitable for discharging the water in sprays or jets, in a manner to impart rotary motion to the body of liquid in the tank and cause the contained zeolite to be distributed throughout the liquid and kept in motion.

Outlet is from the top of the tank, by way of a pipe 4, through which water is delivered to a service pipe 5.

A drain pipe is provided at 6, and connecting and controlling the soft water outlet pipe 4, the service pipe 5, and the drain pipe 6, there is a valve 7. This valve is moveable to one position to cut off the drain pipe and open the soft water supply to the service pipe and to another position to cut off the service pipe and open the soft water pipe to the drain.

When the water softening process is in operation, the position of the valve is that first above described, and when the tank is being salted to regenerate the contained zeolite, the valve is automatically shifted to the position last above described, as will be hereinafter explained.

Attached to or otherwise suitably supported exteriorly of the main tank 1, there is a small auxiliary tank 8, designed as a container for salt or the salt solution employed in regenerating the zeolite in the main tank. The auxiliary tank 8, is, in effect, an open tank and would serve every purpose here required, if so constructed, but to avoid splashing of the liquid over the sides and to give the apparatus a more finished appearance, the tank is provided with a cover 9, having a large centered and upwardly flanged opening 10, through which salt is entered in the tank.

Loosely covering but not tightly closing the opening 10, there is an inverted salt measure 11, provided for the convenience of the attendant in determining the quantity required for each salting operation.

The auxiliary tank 8 is provided with a hard water inlet through a branch connection 12, from the main supply pipe 2. This inlet pipe is continued downward within the tank to any suitable depth but preferably terminates near the center at the bottom thereof, being controlled by a float valve 13, by means of which any desired water level may be maintained in the tank.

An overflow connection 14 is provided from the tank 8, to the drain pipe 6.

The bottom of the auxiliary tank 8 is, in effect, coned and from an outlet 15, therein, screened or open, as desired, a connection 16, leads through a check valve 17, to an ejector 18, which is connected in the main hard water supply pipe 2, at a point below the branch inlet connection 12, therefrom to the auxiliary tank 8.

It will thus be seen that the arrangement of the inlet and outlet connections to the auxiliary tank is such as to form a by-pass through the tank and around the ejector in the main supply pipe, fully compensating for the restriction therein formed by the ejector nozzle and avoiding any resulting reduction in the pressure or volume of the inflow of hard water to the main tank.

The operation of the apparatus, thus far described, is as follows: The main tank is filled to within a foot or so of the top with zeolite. This can be entered through the large screw plug 19, in the top of the tank and, as the zeolite lasts indefinitely, under regeneration from time to time as required, there will be no occasion, under normal conditions, for again removing the screw plug, etc., once the tank is charged with zeolite.

In order that hard water may enter and flow through the main tank, there must be an outlet for the soft water therefrom and with the valve 7, normally spring held, cutting off the drain, such an outlet is usually provided by opening a faucet in the soft water service pipe.

Through the connections described, hard water then enters both tanks, the flow being direct from the supply, through the ejector 18, to the main tank and through the connection 12, to the auxiliary tank. Arranged as shown, the ejector acts to draw water from the auxiliary tank, which unites with the discharge from the ejector to increase the flow and maintain the necessary supply to the main tank. As the water rises in the main tank, the zeolite is carried upward in floating suspension, and due to the action of the inlet spray or jet nozzle, the water in the tank will be given a gradually increasing rotary motion, causing the zeolite particles to separate and become completely distributed throughout the moving body of water, with the result that the water softening process, above described, is so greatly expedited, as to permit a more rapid flow through the tank, thereby materially increasing the soft water supply for any given period of time.

As previously explained, it is necessary, from time to time, to regenerate the zeolite in the main tank. This is done by emptying a suitable quantity of common salt into the auxiliary tank and the regenerating operation is thereafter automatic. The salt, settling towards the botton of the auxiliary tank, dissolves rapidly, forming a concentrated brine or salt solution, which is drawn therefrom by the action of the ejector 18, and carried by the hard water supply through the pipe 2, into the main tank, entering at the bottom thereof, as above described.

The extension of the fresh water inlet to the bottom of the auxiliary tank and the screening of the adjacent outlet may be omitted, if desired, as I have found that both coarse salt and rock salt will pass the ejector, and enter the main tank, thus making it unnecessary to effect complete dissolution in the auxiliary tank.

To save time and labor of an attendant in manually shifting the valve 7 to by-pass the brine and waste water to the drain, and further to avoid the necessity of making repeated "soap tests", to determine whether the effectiveness of the zeolite has been restored and the tank is cleared of the salt solution, I provide means for electrically operating the valve 7. In order to correctly time the operation of the valve, I utilize the salt solution as it is about to enter the main tank, to close the valve operating circuit, and also make it serve, as the solution passes out of the main tank and is replaced by fresh water, to break the valve operating circuit, thereby permitting the spring $7^a$, to shift the valve back to normal position and automatically put the water softening process again into effective operation. From the foregoing it will be seen that the interruption of the softening process is limited to the period of time required for the passage of the salt solution through the tank.

For electrically operating the valve 7, against the action of its spring $7^a$, any suitable or well known form of electrical or electro-magnetic device may be employed.

In the device shown, there is a solenoid 20, the core of which is formed as a continuation of the stem of the valve 7. One terminal 21 of the solenoid winding is connected through a lead 22, to the live side of a power supply circuit and from the other terminal 23 of the winding, two ground leads 24, 25, run to open switches 26, 27, one side of each switch being insulated and the other side grounded.

The open switches employed are preferably in the form of bakelite plugs $26^a$, $27^a$, each provided centrally with an adjustable metallic electrode $26^b$, $27^b$. The plugs are screwed into T-members 28 and 29, forming part of the grounded outlet connections of the auxiliary and main tanks.

When the softening process is in operation, fresh water passing through the outlets of the auxiliary and main tanks and bridging the space between the insulated electrodes of the plugs and the adjacent grounded piping, will not have sufficient conductivity to close the circuit through the valve operating solenoid, but, as the brine or salt solution, used in regenerating the zeolite, enters the outlet of the auxiliary tank, its conductivity being greater, will effectively close the circuit, causing the valve to be shifted and held against the action of its spring, in a position cutting off the soft water service pipe and opening the main tank outlet pipe to the drain connection. The circuit thus closed continues closed until all of the brine or salt solution is drawn from the auxiliary tank by the action of the ejector.

Before the solution in the auxiliary tank becomes sufficiently diluted by the incoming fresh water, so that it is no longer conductive, the strong solution driven into the main tank, will have reached the outlet thereof at the top and closed the circuit at that point, holding it closed until all of the solution passes out of the main tank outlet and fresh water begins to run. The circuit then being broken at both points, the valve operating solenoid ceases to function and the spring $7^a$ returns the valve to normal position, cutting off the drain connection and opening the main tank outlet to the soft water service pipe.

As shown, the electrodes $26^b$ and $27^b$, are made adjustable in the bakelite plugs and by exposing more or less of the electrodes for contact with the liquid, a rapid or delayed closing of the control valve may be obtained, as desired.

As the many important advantages of the invention will be apparent from the foregoing description, it will not be necessary to further elaborate the same.

Having thus described my invention, what I claim is:

1. A water softening apparatus comprising a main tank containing water softening material in suitable quantity and provided with an inlet and an outlet, an auxiliary tank permanently connected in open communication with and discharging into the main tank, a plurality of connections from the tank outlet, an electrically operated valve movable to direct delivery from the outlet to any one of the connections, and means utilizing the solution for automatically closing and opening a power circuit to operate the valve as required.

2. A water softening apparatus comprising a main tank containing water softening material in suitable quantity and provided with an inlet and an outlet, an auxiliary tank permanently connected in open communication with and discharging into the main tank, service and drain connections from the tank outlet, an electrically operated valve movable to direct delivery from the outlet to either the service or to the drain connection, and means utilizing the regenerating solution for automatically closing a power circuit to operate the valve as required.

3. A water softening apparatus comprising a main tank containing water softening material in suitable quantity and provided with an inlet and an outlet, an auxiliary tank permanently connected in open communication with and discharging into the main tank, service and drain connections from the tank outlet, an electrically operated valve spring held in one position and moveable to another position to direct delivery from the outlet to the drain connection, and means utilizing the regeneration solution for automatically closing a power circuit to shift the valve as required.

4. A water softening apparatus comprising a main tank containing water softening material in suitable quantity and provided with an inlet and an outlet, an auxiliary tank permanently connected in open communication with and discharging into the main tank, service and drain connections from the tank outlet, a valve spring held in one position and movable to another position to direct delivery from the outlet to the drain connection, electrical mechanism for operating said valve, and an open switch adapted to be bridged by the regenerating solution to automatically close a power circuit for energizing the valve operating mechanism as required.

5. A water softening apparatus comprising a main tank containing water softening material in suitable quantity and provided with an inlet and an outlet, an auxiliary tank permanently connected in open communication with and discharging into the main tank, service and drain connections from the tank outlet, a valve spring held in one position and movable to another position to direct delivery from the outlet to the drain connection electrical mechanism for operating said valve, and open switches in the inlet and outlet of the tank adapted to be bridged by the regenerating solution to automatically close and open the power circuit for energizing the valve actuating mechanism to operate the valve as required.

I affix my signature.

RICHARD E. WAGNER.